Feb. 7, 1933.   H. V. STEUERNAGEL   1,896,113
CLAMP CARRYING MACHINE
Filed Aug. 19, 1931   3 Sheets-Sheet 2
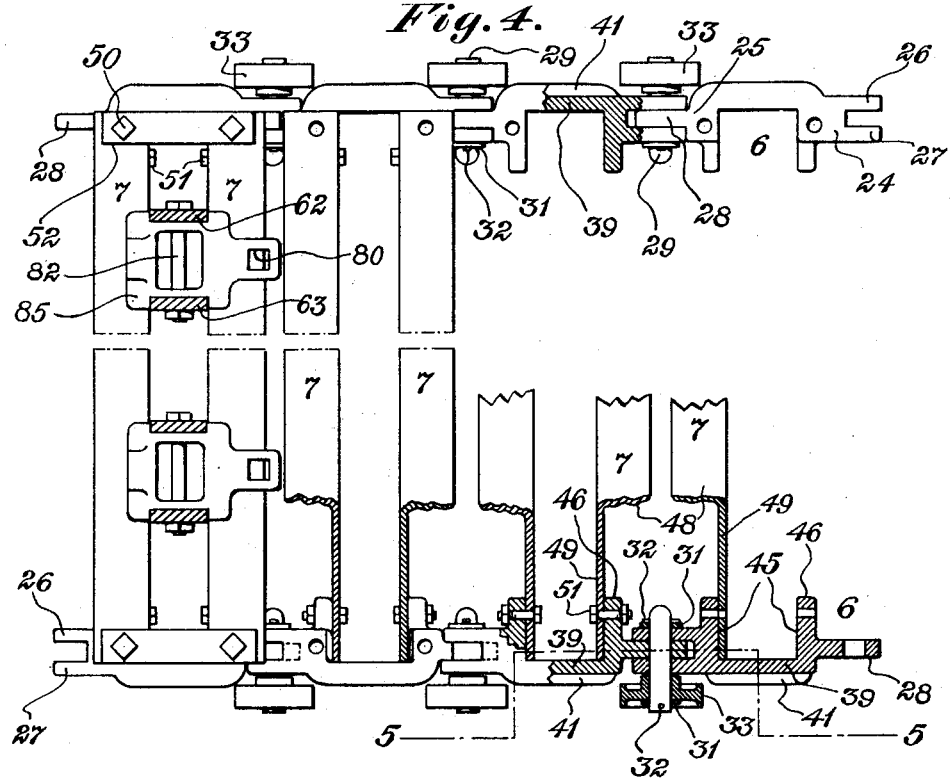
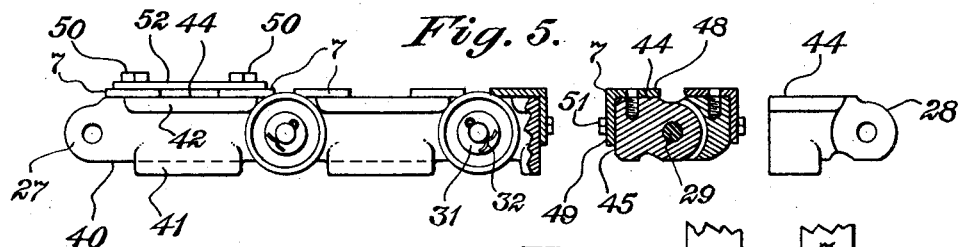
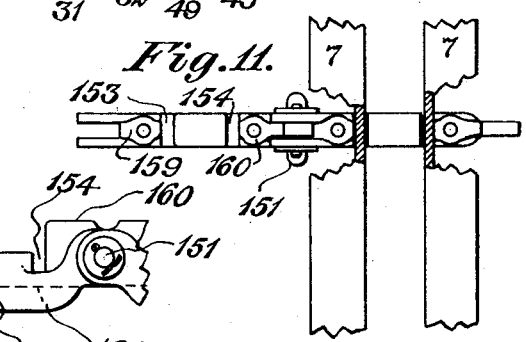
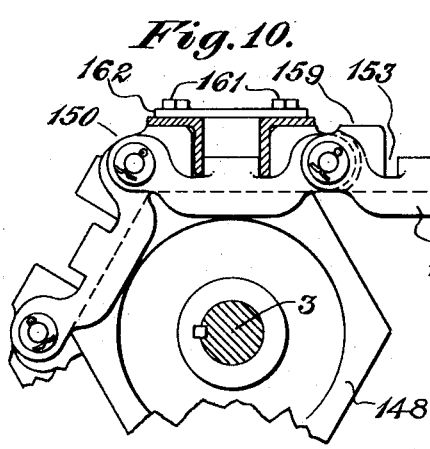
Inventor:
Hugo V. Steuernagel
By F. E. Anderson
His Attorney Feb. 7, 1933.  H. V. STEUERNAGEL  1,896,113
CLAMP CARRYING MACHINE
Filed Aug. 19, 1931   3 Sheets-Sheet 3
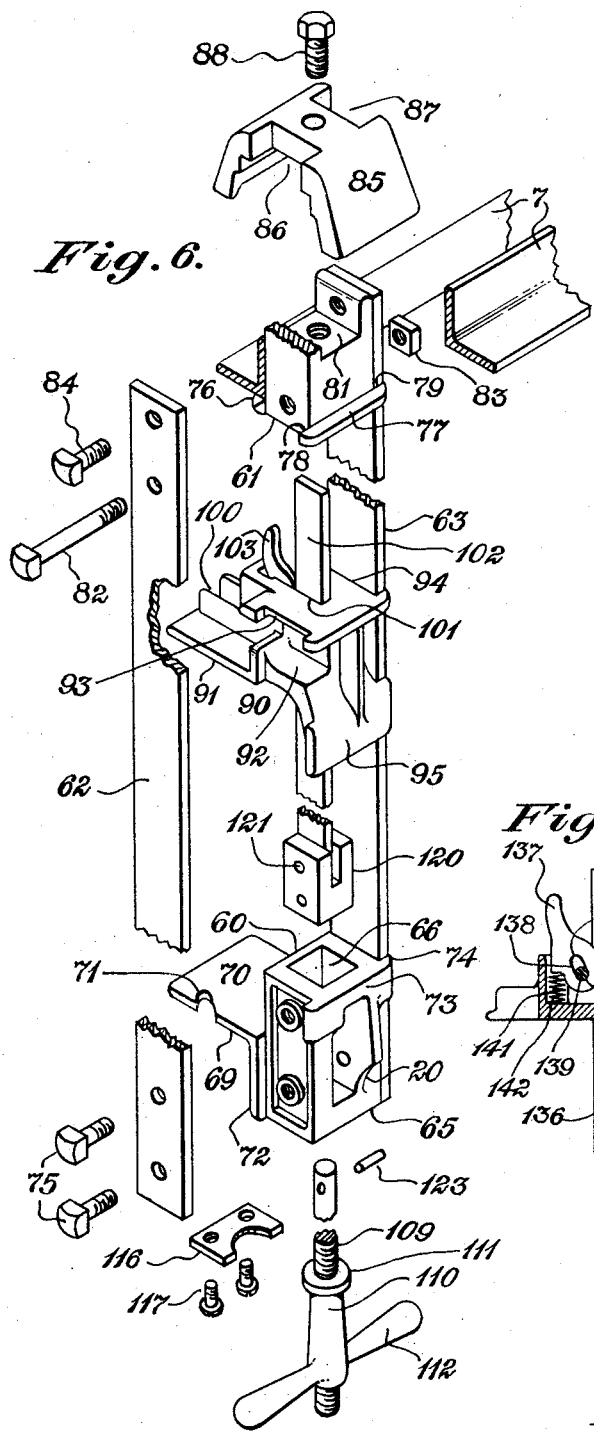
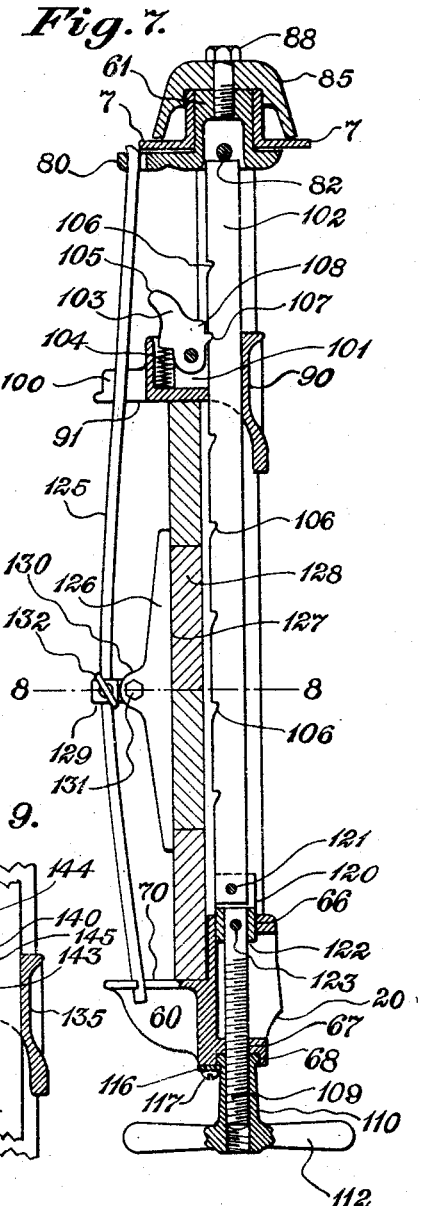
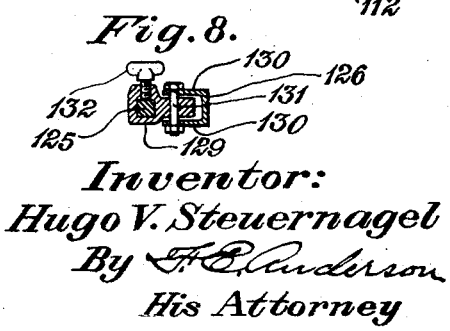
Inventor:
Hugo V. Steuernagel
By F. E. Anderson
His Attorney Patented Feb. 7, 1933

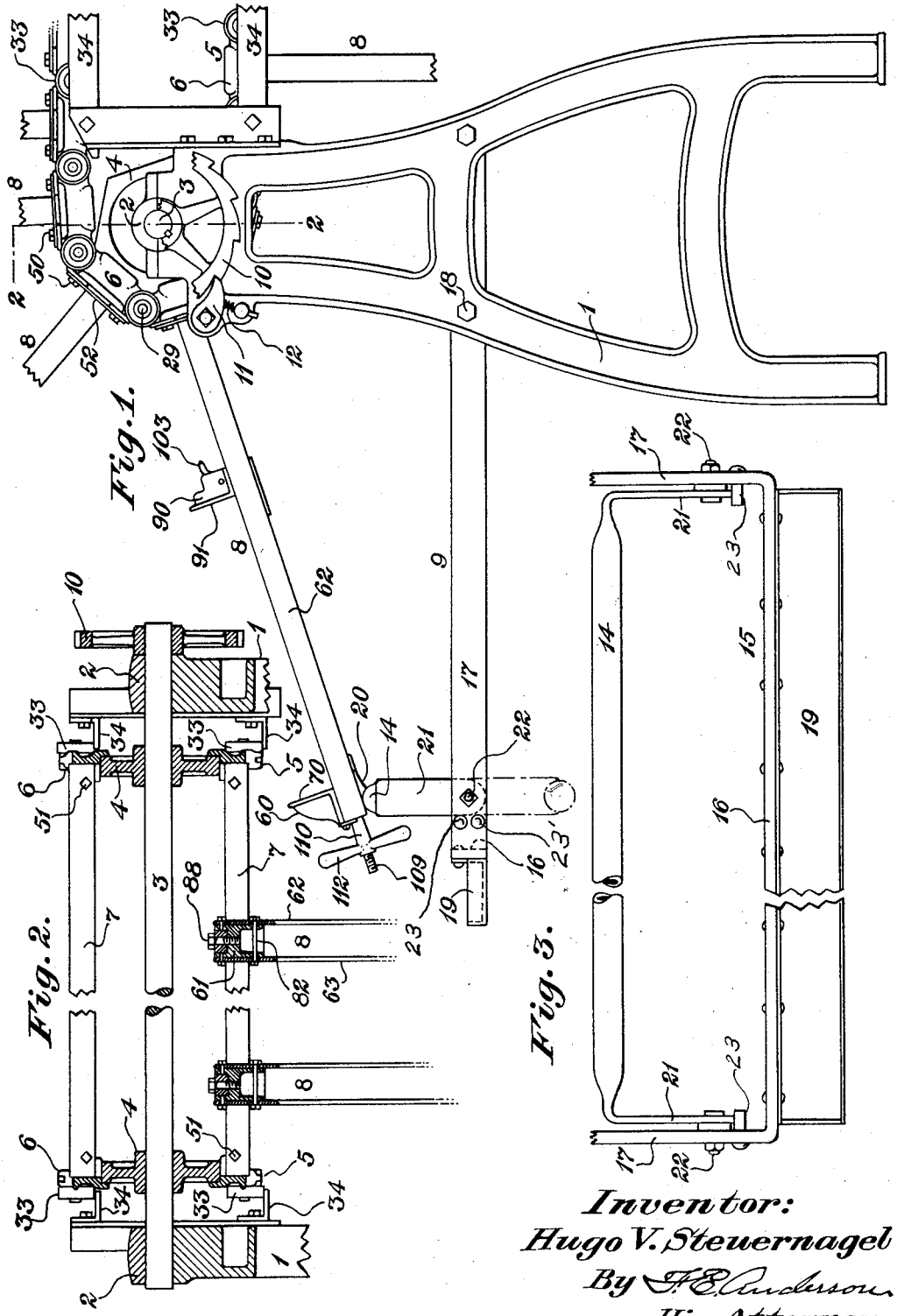

1,896,113

UNITED STATES PATENT OFFICE

HUGO V. STEUERNAGEL, OF EAST HARTFORD, CONNECTICUT

CLAMP CARRYING MACHINE

Application filed August 19, 1931. Serial No. 558,118.

This invention relates to clamp carrying machines of the general character intended for use in establishments where quantities of lumber in comparatively small uniform sections are glued together to form larger units suitable to be worked into the manufacture of various articles of furniture. As commonly known such machines include an endless or rotary support with which many clamps are associated in an arrangement whereby separate groups of clamps are consecutively presented before an operator in position where they are held conveniently for loading or unloading. When one group of clamps has been loaded the clamp carrier mechanism is actuated to present to the operator the next consecutive group of clamps to receive its load. With this procedure continued the carrier eventually becomes filled to capacity with glued material for which the machine serves as a container for a compact load. The cycle of time employed to load the machine to capacity may be made to correspond to the amount of time it takes for the glued joints of a unit to properly set. In this event the use of the machine may be made to be continuous and highly efficient. Objects of the present invention include the provision of improvements in details of structure, to wit: means for supporting clamps in manipulating position in a manner whereby required movement of the support is permissible without the inconvenience heretofore commonly imposed upon an operator; improved conveyer structure wherein two angle bars are associated with each pair of oppositely disposed links; an improved joint for associating the clamps with the cross angle bars of the conveyer; improved mounting of adjustable clamp member and means for association therewith of a bar connecting adjustable clamp members with actuating means therefor. These and other objects and advantages of the invention will be more fully set forth and readily understood from the following detailed description.

In the accompanying drawings,—

Figure 1 is a side view of part of a clamp carrying machine constructed in accordance with my invention.

Figure 2 is a sectional view on line 2—2 of Fig. 1.

Figure 3 is a detail plan view of a bracket and a clamp supporting bar associated therewith said bar being shown intermediate the extreme positions to which it is movable.

Figure 4 is a detail plan view of conveyer construction, certain parts being indicated as broken away and in section.

Figure 5 is a side view of the conveyer elements shown in Fig. 4, certain of said elements being shown in section as on line 5—5 of Fig. 4.

Figure 6 is an isometric view of parts of a clamp partly assembled or in position adjacent their normal position in an assembled clamp. Means for attaching a clamp to a pair of transverse angle bars are also shown in this view, said bars being only partially shown.

Figure 7 is a longitudinal sectional view of the clamp and certain parts substantially as shown in Fig. 6. There is also shown in this view a presser bar and foot associated with the clamp.

Figure 8 is a sectional view on line 8—8 of Fig. 7.

Figure 9 is a detail view in section showing a modified form of detent for holding an adjustable clamp member to its draw bar.

Figure 10 is a side view of a chain and sprocket which may be employed when the distance between side chains of a conveyer is of considerable extent.

Figure 11 is a plan view of the form of chain shown in Fig. 10, portions of a pair of angle iron cross bars are also shown.

Referring to the drawings the general structure of a clamp carrying machine embodying the features of my invention may be described briefly as follows:—A conveyer supporting frame includes leg members as 1 laterally spaced apart at each end of the machine. Each of a pair of oppositely laterally disposed legs has bolted to its upper end a journal box as 2 to receive respectively the ends of a shaft as 3. Secured to each shaft adjacent the inner side of each journal box is a sprocket wheel 4. As shown these sprocket wheels are hexagonal in form and support conveyer chains 5 disposed at each side of the machine. The chains are made up of pivotally connected links 6 having flat surfaces to match and engage the flat sides of the sprocket wheels in a manner to form driving relation between said sprocket wheels and the chain. The chain links are of novel form which will hereinafter be more fully explained. Between each oppositely disposed pair of chain links there is provided in back to back relation a pair of laterally spaced angle bars 7 which are securely fastened at their ends to the links. To these angle bars are attached clamps which are indicated in a general way by 8. These will presently be explained in detail. At one end of the machine, a bracket structure 9 is provided for supporting a shiftable bar, the purpose of which is to support a transverse series of clamps in position for convenient manipulation as in loading and unloading, which is to say when glued parts comprising the work are introduced or taken from the machine. Each transverse series of clamps is movable into position on the bar support through movement of the conveyer, the clamps being brought into contact with the bar by pulling them preferably downwardly from an upper position, this being the most convenient way for an operator to move the conveyer in the absence of power driving means which may if desired be introduced into the machine but which is not here shown. Means for preventing retrograde movement of the conveyer is provided by a ratchet wheel 10 engageable by a pawl 11 which is actuated by spring 12. The ratchet wheel is secured to a sprocket shaft adjacent the outside of a journal box 2.

Continuing this description more in detail the shiftable bar structure for supporting the clamps, in what will hereinafter be called loading position, will now be described. Extended from one end of the machine frame at a height well above the floor level means are provided for associating the shiftable bar 14 with the machine frame. Preferably a U-shaped bracket 15 is employed for this purpose. It may comprise a transverse portion 16 merging into the ends 17 which are secured to respective legs of the machine frame as by bolts 18. As a place for an operator to keep conveniently at hand such tools as may be desirable, a tray as 19 is secured to the transverse portion of the bracket. Adjacent said transverse portion and pivotally associated with each end of the bracket is a bar 14 of wide and shallow U-shape with its ends swedged into flattened arms 21 through which the pivot bolts 22 extend into respective ends of the bracket. From the foregoing it will be obvious that the bar 14 may be swung from the position in which it is shown in full lines to the position in which it is shown in dotted lines. In the former position it serves to support the clamps conveniently for loading and in the other position the bar is clear of the path traversed by the clamps as they are moved by the conveyer. It will be noted that swinging movement of the clamp supporting bar, by which it is shifted from supporting position to a position to clear the path of the clamps, is inwardly toward the machine frame and not outwardly into interfering relation with an operator. When a series of clamps is to be released by the bar the clamps are slightly raised to free the bar from latch forming lugs 20 extended from the clamps, the bar being then swung to lower position out of the path of movement of the clamps. The next series of clamps is then brought down into loading position and the bar is swung upwardly into clamp supporting position. For definitely determining supporting position of the clamp engaging bar and to limit its downward swinging movement, respective stop pins 23 and 23' are associated with bracket 15. The ratchet mechanism to which brief reference has been made, and which is intended primarily for preventing retrograde movement of the conveyer, is so proportioned that the pawl 11 will click off a ratchet tooth approximately at the instant when a series of clamps arrives at loading position. An audible signal is thus given an operator when a series of clamps has reached loading position thereby indicating to him when to return bar 14 to its upper or clamp supporting position.

Detailed construction of the clamp carrying mechanism will next be described. Each link 6 entering into the make-up of the conveyer chains includes end portions 24 and 25. Link end 24 is slotted to form laterally spaced lugs 26 and 27 and the opposite link end 25 is laterally reduced to form the lug 28. This single lug 28 is aligned with the space between the spaced lugs and thus the double-lug end of a link is formed to match the single-lug end of an adjoining link and vice versa. The lugs at each end of each link are provided with holes to receive pivot pins 29. The latter may be formed with a head at one end and adapted at the other end to receive a washer as 31 and a retaining cotter pin 32, or, as shown, a washer and cotter pin may be provided at each end. Pins or studs 29 serve also to carry anti-friction rollers 33. These are adapted to engage angle iron elements 34 which are secured to the machine frame to form a track for supporting the upper and lower runs of conveyer chains.

Referring again to the structural formation of individual links, there is extended between the ends thereof, in the plane of the outer one of the spaced lugs 26 and 27, a lateral web 39, having a sprocket engaging flat surface 40 merging with the ends 24 and 25. There is also provided adjacent the flat surface 40 a flange 41 serving to strengthen web 39 and adapted to engage the side of sprocket wheels and thereby effect proper alignment of the conveyor. To further strengthen the web 39 a rib 42 is formed thereon at the edge opposite to flange 41 as shown.

Provision is made on the end of each link for securing thereto a respective end of the before mentioned cross bar angle irons 7. For this purpose each link end is formed with right angular intersecting surfaces as 44 and 45, the latter merging with that of a lug as 46 laterally extended from each end of a link on the side thereof opposite to web 39. The internal angle of legs 48 and 49 of a bar 7 matches respectively the surface 44 and surface 45, and with said respective surfaces of a bar and link end contiguous and the end of the bar abutting the link web 39, a very rigid joint is made by passing bolt 50 through one angle leg into the link end and bolt 51 through the other angle leg into lug 46. The joint may be further strengthened by extending a short tie bar 52 across the ends of bars 7 where they engage a link and securing to the link both the bars 7 and the tie bar 52 by means of bolts 50. The transversely extending conveyer unit formed in the manner described of a pair of oppositely disposed links and two parallel spaced angle bars united therewith makes a strong and rigid support for a transverse series of clamps 8. The structure of one of these clamps and means for associating it with the conveyer will now be described.

Rigidly associated elements of my preferred form of clamp structure include principally a stationary jaw 60 which forms the outer or free end of the clamp, an anchor block 61 adapted as will more fully appear to serve as a member of a joint for uniting a clamp with the conveyer, and guide bars 62 and 63 extending between and effectively secured to both the jaw 60 and anchor block 61. That which will be referred to as the body 65 of the stationary jaw is in general form rectangular and somewhat elongated. It is preferably hollow with a square hole or flat sided opening 66 in the web of one end and a circular hole 67 in the other end, said hole 67 being countersunk at 68. The purpose of these holes will later appear. Merging with one side of the body 65 is an angle-iron shaped, braced extension 69 forming a clamp face 70 which is at right angles to the body intermediate its ends. Extension 69 is notched at 71 for a purpose that will later appear, it also forms a flange 72 on each side of the body, extending from one end thereof for about half its length. On the opposite end the body merges into an extension 73 which provides reinforcement adjacent the square hole 66 and also forms a flange 74 on each side of the body on the side of the latter opposite to respective flanges 72. These flanges on opposite sides of the body define respective channels to receive and align the guide bars 62 and 63 which are secured to the stationary clamp body as by bolts or screws as 75. Similarly at its opposite end the pair of laterally spaced guide bars 62 and 63 is secured to the anchor block 61. Said block is also of general rectangular form having at one end flanges 76 and 77 which extend across opposite sides of the block, said flanges being so extended as to form respective channels 78 and 79 to engage the pair of guide bars. From flange 76, a perforated lug 80, is extended for a purpose that will hereinafter appear. Across the end of the block opposite to that provided with flanges 76 and 77 is a channel 81 the sides of which are in parallelism with the sides of the block which the guide bars engage flatwise. The purpose of this channel will presently appear. For securing the guide bars to the anchor block a bolt 82 is preferably passed through both bars and the block and is provided with a nut 83 for drawing the several parts firmly together. Nearer the end of each bar a screw as 84 is inserted and threaded into the block. The described assembly of anchor block and guide bars makes a rigid clamp end of a form and size to freely fit between the spaced angle bars already described as associated with a pair of oppositely disposed links to form a clamp conveyer unit. The anchor block clamp end is introduced between angle bars 7 with the flanges 76 and 77 adjacent respectively to the coplanar legs of the bars. Means for securing the clamp end in this relation to the bars comprises a cross head 85. The ends of this cross head are adapted to straddle the angle bars 7 on opposite sides of the anchor block and to engage the coplanar legs of said bars in opposition to flanges 76 and 77 of the block. The intermediate section of the cross head is reduced in width by oppositely formed channels 86 and 87. The width of section of the cross head thus reduced is made to fit the end channel 81 of the anchor block and when the cross head is seated in said channel as in normal relation of the assembled parts the ends of the guide bars 62 and 63 are also seated respectively in channels 86 and 87. Preferably, as shown, the anchor block and cross head are secured together in assembled relation with angle bars 7 by a single screw 88 passed through the mid section of the cross head and threaded into the anchor block. The described arrangement makes the matter of securing clamps to the conveyer a very simple one. It is to be understood that the cross head does not secure the clamp to angle bar 7 with a clamping action. The connection is made a sufficiently free fit to permit the clamp to be slid longitudinally of the cross bars to position the clamps laterally of the conveyer as may be desired. Furthermore it is desirable that the clamps may partake of a slight amount of angular motion about an axis in the vicinity of the anchor block in order to permit a certain amount of freedom from exact alignment of a transverse series of clamps, more or less departure from such an alignment being desirable to compensate for irregularities of stock to be held by the clamps.

The guide bars 62 and 63 extending between the fixed clamp jaw 60 and anchor block 61 have been so termed because they guide the clamp jaw 90 which is supported by and movable thereon. Like the stationary clamp the part of the movable clamp having the clamp face 91 thereon is of braced angle-iron form merging from the body 92 which is laterally channeled at 93 and 94 to receive respective guide bars 62 and 63. Were not means provided to prevent it, pressure on the clamp face 91 would tend to tip the clamp and make it bind on its guide bars. To offset this action there is extended from the clamp body and in advance of the plane of the clamp face, the flanged foot 95 which so distributes contact of the clamp with the guide bars as to make it easily movable thereon by clamp adjusting means which will presently be described.

Intermediate its guide bar engaging sides the body of the movable clamp jaw is channeled at 100 for a purpose that will presently appear, furthermore it is slotted at 101 to receive a flat draw bar 102 upon which the jaw member is adjustable. The term "flat" is applied to the draw bar to define the bar as having relatively narrow edges and broad sides, and the terms "edges" and "sides" are hereinafter employed in defining the position of the bar with respect to its flatwise extent relative to associated parts. Attention is particularly directed to the arrangement of the draw bar whereby its sides are supported by the sides of slot 101 extending through the movable clamp jaw while the edges of the bar are presented for advantageous gripping action to lock the movable jaw thereto as will presently more fully appear. In a form of clamp heretofore commonly employed a flat draw bar has been provided having perforations adapted for engagement by a detent or latch associated with a movable jaw. Such an arrangement of a perforated bar is objectionable because of the fact that such free end of the draw bar as may be beyond the movable jaw is prone to become distorted under influence of the tension to which it is subjected in use and to require straightening before adjustment of the jaw further to the rear can be effected. In the present invention such distortion of the draw bar is entirely prevented by its adequate support furnished by the sides of the slot in the movable jaw and the balanced resistance of gripping areas which serve to lock the jaw in position upon the bar. In order to secure the movable jaw against movement from a selected adjustment upon the draw bar there is pivotally mounted in slot 101 a draw bar engaging detent 103 constantly urged toward coaction with the bar by a spring 104. At the rear of the clamp jaw an extension 105 projects from the detent by means of which it may be released from jaw locking position. Preferably there is provided at intervals along one edge of the draw bar suitable notches 106 to receive the detent projection or toe 107. When a toe and notch are engaged the heel 108 of the detent lies contiguous to the edge of the draw bar which it is adapted to grip firmly when pressure is brought to bear upon the clamp face of the jaw, said pressure when transmitted to the bar being resisted by the oppositely disposed wall of slot 101. Thus the toe of the detent initially merely serves to locate the movable clamp jaw upon the draw bar and subsequently imposed thrust is resisted by substantial and advantageously disposed areas. This arrangement whereby the movable clamp jaw is associated with bar 102 provides for approximate adjustments of said jaw with respect to the stationary jaw. For final adjustment of the former relative to the latter as when gripping the work, means are provided in association with the stationary jaw. Such means include as shown a screw 109 and a nut 110, the latter having a flange 111 at one end and actuating handles 112 near the other end. The nut is associated with jaw 60 so that it is free to turn but longitudinally fixed with respect to the jaw. To permit this action flange 111 is seated within counterbore 68 and retained longitudinally therein by plate 116 which is secured to the jaw as by screws 117. From the foregoing it will be clear that rotation of nut 110 will cause endwise movement of the screw. Such movement is imparted to draw bar 102 through an intermediate coupling 120 which is square in cross section and of a size to freely fit the square hole 66 in jaw 60. Thus while longitudinal movement of the bar is permitted, rotation thereof is prevented. To permit free alignment and non-binding support of the bar with relation to its mounting in the clamp structure its association with the coupling 120 is effected with a pivotal pin 121 somewhat in the nature of a connection in a universal joint. As shown the end of screw 109 enters a socket 122 in coupling 120 and is rigidly held therein by a pin 123. As already stated an adjustment of movable jaw 90 approximate to requirements is effected by movement of the jaw to appropriate location on bar 102, the final adjustment of the jaw is then secured by movement of the jaw, bar and screw as a unit by means of the actuating nut associated therewith. Obviously such range of movement of the bar as may be required is comparatively limited, about equal in fact to the distance between the notches 106 on bar 102. Limit of movement of the bar each way may be established by stop means which insure that the coupling 120 will not be moved beyond the confines of its squared or flat sided opening in jaw 60. In one direction limit of movement of the bar is established by contact between coupling 120 and the inside of its supporting jaw structure and in the other direction by contact of the free end of the bar 102 with bolt 82 of the anchor block.

When work loaded into the clamps is of considerable width it may be desirable to provide means for holding down its intermediate sections. Such means may include a presser bar 125 and a presser foot 126. In order that the presser foot may readily adapt its flat surface 127 to that of the work 128 it is associated with the bar by means of a coupling as 129 which is pivotally united to lugs 130 of the foot by a bolt 131. The outer end of the coupling is perforated to receive the presser bar and for holding the foot in any selected position upon the bar a thumb screw 132 is threaded into the coupling. The square bar shown may be of any other suitable cross section and substantially equal in length to the distance between an anchor block and the stationary jaw of a clamp. To apply the presser bar and foot, one end of the bar is engaged in the perforated lug 79 of the anchor block of the clamp to which the bar is to be applied. The foot is then moved along the bar until opposed to a part of the work intermediate the clamping jaws where it is secured by thumb screw 132. The other end of the bar is then sprung into engagement with the notch 71 in the stationary clamp, the presser bar being resilient and so held at the ends as to yieldingly apply thrust to the foot as the latter engages the work. Intermediate its ends the presser bar is adapted to extend through the channel 93 in the movable clamp jaw 90 in a manner to perserve lateral alignment of the bar.

The modified form of movable clamp jaw holding means illustrated in Fig. 5 is for association with a clamp jaw 135 which is identically like clamp jaw 90, also the draw bar 136 is like draw bar 102 except that there are no notches formed on the edge thereof adjacent the detent 137. The latter is perforated with an elongated slot 138 to receive pin 139 which pivotally holds the detent in the jaw and provides a fulcrum to resist thrust of the detent when the heel 140 thereof is forced into contact with the edge of the bar. Normally the detent is yieldingly urged toward the bar by spring 141 which is housed in socket 142. When the detent is manually operated to release the bar one end 143 of the slot 138 engages pin 139 so that the detent moves concentrically to the pin and thus clears the bar but when the detent is actuated by the spring the opposite end 144 of the slot is moved to approach the pin until an eccentric relation of the detent and pin is established so that eventually when pressure is brought to bear by manipulation of the clamp screw the heel of the detent is wedged against the bar with a gripping contact. The heel of the detent may be roughened or provided with fine teeth as at 145 to prevent slipping on the bar.

The form of chain shown in Figs. 10 and 11 is designed for supporting and maintaining alignment of cross bar angle irons of a conveyer when the distance between the side chains of the conveyer is of considerable extent. Such a chain if desirable may be added to a machine and supported upon sprockets as 148 located between outside sprockets and keyed to respective shafts 3. Links 150 comprising an intermediate chain are similar in form to the links of the outside chains but of somewhat lighter construction. The links are joined together with pivot pins 151 and each link for the reception of cross bar angle irons 7 is provided with channels 153 and 154 to receive respectively the back to back legs of the cross bars, the coplanar legs of which respectively engage surfaces 159 and 160 of the link. These coplanar legs are secured to the link as by bolts 161 which also secure the overlying tie bar 162. For the purpose of aligning the chain upon the sprockets each link is provided with a flange 163 adjacent the flat sprocket engaging surface 164.

Having thus described my invention, what I claim is,—

1. A clamp carrying machine including in combination, frame members laterally spaced, a clamp carrier supported by the frame members and movable about an axis extending therebetween, a series of clamps, each clamp being secured at one end thereof to the carrier and adapted to pass about the axis extended radially therefrom, each clamp having a latch forming lug thereon, a U-shaped bracket secured at its sides to respective frame members, a U-shaped bar, means for pivotally associating the ends of the bar to respective sides of the bracket whereby the bar may be swung from clamp supporting position to clamp clearing position, and means for limiting the swinging movement of the bar from a position where it may be held to support the clamps by engaging the latch lugs thereon to a position where it will clear the path of the clamps as moved by the carrier.

2. A clamp carrying machine including in combination, frame members laterally spaced, a clamp carrier supported by the frame members and movable about an axis extending therebetween, a series of clamps, each clamp being secured at one end thereof to the carrier and adapted to pass about the axis extended radially therefrom, a U-shaped bracket secured at its sides to respective frame members, a U-shaped bar, means for pivotally associating the ends of the bar to respective sides of the bracket whereby the bar may be swung from clamp supporting position to clamp clearing position, means for limiting the swinging movement of the bar to define its respective positions, and releasable means for maintaining the bar in clamp supporting position.

3. A clamp carrying machine including in combination, frame members laterally spaced, a clamp carrier supported by the frame members and movable about an axis extending therebetween, a series of clamps, each clamp being secured at one end thereof to the carrier and adapted to pass about the axis extended radially therefrom, a U-shaped bracket secured at its sides to respective frame members, a U-shaped bar, means for pivotally associating the ends of the bar to respective sides of the bracket whereby the bar may be swung from clamp supporting position to clamp clearing position, and a tool tray associated with the transverse portion of the U-shaped bracket.

4. A clamp carrying machine including in combination, frame members laterally spaced, a clamp carrier supported by the frame members and movable about an axis extending therebetween, a series of clamps, each clamp being secured at one end thereof to the carrier and adapted to pass about the axis extended radially therefrom, a U-shaped bracket secured at its sides to respective frame members, a U-shaped bar, and means for associating the bar with the bracket whereby it may be moved from clamp supporting position to clamp clearing position without receding farther from the machine frame than when in either of said positions.

5. A clamp carrying machine including in combination, frame members laterally spaced, a clamp carrier supported by the frame members and movable about an axis extending therebetween, ratchet means to prevent backward movement of the carrier, a series of clamps, each clamp being loosely secured at one end thereof to the carrier and adapted to pass about the axis extended radially therefrom, each clamp having a latch forming lug thereon, a U-shaped bracket secured at its sides to respective frame members, a U-shaped bar, means for pivotally associating the ends of the bar to respective sides of the bracket whereby the bar may be swung from a clamp clearing position to a position where the bar is adapted to be held by the latch lugs on the clamps, and means for limiting the swinging movement of the bar to define its respective positions.

6. A clamp carrying machine including frame members laterally spaced, a clamp carrier supported by the frame members and movable about an axis extending therebetween, a series of clamps, each clamp being secured at one end thereof to the carrier and adapted to pass about the axis extended radially therefrom, a bar for supporting the free end of certain clamps when the carrier is at rest and while said clamps are in position for convenient manipulation, said bar while in clamp supporting position extending across the path of the clamps as moved by the carrier, and means for associating the bar with the frame members whereby the bar may be moved out of the path of the clamps without receding farther from the frame members than when it is in clamp supporting position.

7. A clamp carrying machine conveyer construction including in combination, a link member comprising aligned end portions, one of said portions being slotted to form spaced pin receiving lugs and the other laterally reduced to form a pin receiving lug aligned with the space between the spaced lugs, said end portions having a web extended therebetween aligned with one of the spaced lugs and also having extended respectively therefrom and laterally with respect to the web and on the opposite side therefrom supporting lugs, an angle bar associated with each end portion, one leg of each bar lying flat against a respective supporting lug and the other leg of respective bars engaging a flat surface of its respective link end, and means for securing the legs of each angle bar respectively to a supporting lug and to the flat surface of its engaging end.

8. A clamp carrying machine conveyer construction including in combination, a pair of oppositely disposed links, a pair of angle bars extending between the links with respective corresponding legs thereof in back to back spaced parallel relation and with the other respective corresponding legs occupying the same plane, each of said links comprising aligned ends with a lateral web extending therebetween, said ends each being formed with a surface to match a respective coplanar leg of the angle bars and also a surface to match a respective other leg of the angle bars, and means for securing each leg of each bar to each link surface thereby engaged.

9. A clamp carrying machine conveyer construction including in combination, a pair of oppositely disposed links, a pair of angle bars extending between the links with respective corresponding legs thereof in back to back spaced parallel relation and with the other respective corresponding legs occupying the same plane, each of said links comprising aligned ends with a lateral web extending therebetween, said ends each being formed with a surface to match a respective coplanar leg of the angle bars and also a surface to match a respective other leg of the angle bars, and also having thereon a lug to extend said last mentioned surface, and means for securing each leg of each bar to each link surface thereby engaged.

10. A clamp carrying machine conveyer construction including in combination, a pair of oppositely disposed links, a pair of angle bars extending between the links with respective corresponding legs thereof in back to back spaced parallel relation and with the other respective corresponding legs occupying the same plane, each of said links comprising aligned ends with a lateral web extending therebetween, said ends each being formed with a surface to match a respective coplanar leg of the angle bars and also a surface to match a respective other leg of the angle bars, and also having thereon a lug to extend said last mentioned surface, a bar overlying the coplanar legs of the angle bars and opposed to each link, means for securing each bar to its respective link with respective legs of the angle bars secured therebetween, and means for securing the other legs of the angle bars to each link surface engaged thereby.

11. In a clamp carrying machine in combination, a clamp including a pair of laterally spaced flat guide bars, a carrier unit including a pair of angle bars held with respective corresponding legs thereof in back to back spaced parallel relation and with the other respective corresponding legs occupying the same plane, a flanged anchor block secured between the guide bars and extending between the angle bars, with the flange of the block adjacent the coplanar legs of the angle bars, a cross head adapted to straddle the angle bars and engage the coplanar legs thereof in opposition to the flange of the anchor block, and means for securing the cross head to the anchor block.

12. In a clamp carrying machine in combination, a clamp including a pair of laterally spaced flat guide bars, a carrier unit including a pair of angle bars held with respective corresponding legs thereof in back to back spaced parallel relation and with the other respective corresponding legs occupying the same plane, an anchor block secured between the guide bars at one end of the latter, said block having a flange at its inner end channeled to receive the guide bars and also having a channel at its outer end, a cross head adapted to be engaged by the end channel of the anchor block, and means whereby the cross head may be secured to the anchor block when the latter is introduced between the angle bars with the flange of the block adjacent the coplanar legs of the angle bars and forming with the flange and sides of the anchor block openings which loosely conform to the angle bars.

13. A clamp including in combination, a pair of laterally spaced flat guide bars, an anchor block secured between the bars at one end thereof, said block being channeled to receive the bars, a stationary jaw secured between the bars at the end thereof opposite the anchor block, said jaw being laterally channeled to receive the bars, having a flat sided opening at its inner end and a countersunk bore at its other end, a movable jaw laterally channeled to receive the bars, having a bar engaging foot extended forwardly of the clamping face and a median slot therethrough with sides of the slot opposed to the sides of the bars and one edge of the slot merging into a socket, a hand nut associated with the stationary jaw and adapted for rotation with respect thereto, means for preventing longitudinal movement of the nut with respect to the jaw, a screw engaged by the nut, a flat sided coupling transversely pivoted to the screw and longitudinally movable thereby within the flat sided opening of the stationary jaw, a flat draw bar transversely pivoted to the coupling and extending through the median slot in the movable jaw, a detent pivoted in the slot for engagement with the draw bar, and a spring within the socket for normally holding the detent in locking engagement with the draw bar.

14. A clamp including in combinaton a pair of laterally spaced flat guide bars, an anchor block secured between the bars at one end thereof, a stationary jaw secured between the bars at the end thereof opposite the anchor block, said jaw having a flat sided opening at its inner end and a countersunk bore at its outer end, a movable clamp jaw slidably associated with the guide bars and having a median slot therethrough with the sides opposed to the sides of the guide bars and with one edge of the slot merging into a socket, a hand nut associated with the stationary jaw and adapted for rotation with respect thereto, means for preventing longitudinal movement of the nut with respect to the stationary jaw, a screw engaged by the nut, a flat sided coupling transversely pivoted to the screw and longitudinally movable thereby within the flat sided opening of the stationary jaw, a flat draw bar transversely pivoted to the coupling and extending through the median slot in the movable jaw and supported at its sides thereby, a detent pivoted in the slot for engagement with an edge of the draw bar, and a spring within the socket for normally holding the detent in engagement with the draw bar.

15. A clamp including in combination, a pair of laterally spaced flat guide bars, an anchor block secured between the bars at one end thereof, said block being channeled to receive the guide bars, a stationary jaw secured between the bars at the end thereof opposite the anchor block, said jaw being laterally channeled to receive the bars, a movable clamp jaw laterally channeled to receive the bars and having a bar engaging foot extended forwardly of the clamping face of the jaw and also having a median slot therethrough with sides thereof opposed to the sides of the bars, a flat draw bar associated with the stationary jaw, held against rotation thereby and extending through the slot in the movable jaw and supported at its sides thereby, means associated with the stationary jaw for actuating the draw bar, and means associated with the movable jaw for adjustably clamping it to the draw bar.

16. A clamp including in combination, a pair of laterally spaced flat guide bars, an anchor block secured between the bars at one end thereof, a stationary jaw secured between the bars at the end thereof opposite the anchor block, a movable jaw slidably associated with the guide bars and having therein a median slot with sides thereof opposed to the sides of the guide bars, a flat draw bar associated with the stationary jaw, held against rotation thereby and extending through the slot in the movable jaw and supported at its sides thereby, means associated with the stationary jaw for actuating the draw bar, and a detent pivoted in the slot and operable in the plane of the draw bar to engage the edge thereof.

17. A clamp including in combination, a pair of laterally spaced flat guide bars, an anchor block secured between the bars at one end thereof, a stationary jaw secured between the bars at the end thereof opposite the anchor block, said jaw having a flat sided opening at its inner end, a movable jaw slidably associated with the guide bars, a hand nut associated with the stationary jaw and adapted for rotation with respect thereto, means for preventing longitudinal movement of the nut with respect to the stationary jaw, a screw engaged by the nut, a flat sided coupling transversely pivoted to the screw and longitudinally movable thereby within the flat sided opening of the stationary jaw, and a flat draw bar transversely pivoted to the coupling and connected with the movable jaw.

18. A clamp including in combination, a pair of laterally spaced flat guide bars, an anchor block secured between the bars at one end thereof, a stationary jaw secured between the bars at the end thereof opposite the anchor block, a movable jaw slidably associated with the guide bars, a flat draw bar with sides opposed to sides of the guide bars and engaged by each jaw on opposed sides to prevent rotation of the bar, means associated with the stationary jaw for moving the draw bar endwise, and means associated with the movable jaw for adjustably clamping it to the draw bar.

19. A clamp including in combination, a pair of laterally spaced guide bars, an anchor block secured between the bars at one end thereof, a stationary jaw secured between the bars at the end thereof opposite the anchor block, said jaw having a flat sided opening at its inner end and a screw receiving bore at its outer end, a movable jaw slidably associated with the guide bars and having a median slot therethrough, a draw bar extending between the jaws and held against rotation by its engagement on opposed sides with the flat sided opening of one jaw and the slot of the other, a nut rotatively associated with the stationary jaw but held against longitudinal movement with respect thereto, a screw engaged by the nut and connected to the draw bar, and means for securing the movable jaw to the draw bar.

20. A clamp including in combination, a pair of laterally spaced guide bars, an anchor block secured between the bars at one end thereof, a stationary jaw secured between the bars at the end thereof opposite the anchor block, a movable jaw located between the guide bars and slidable thereon said jaw having a median slot parallel with the guide bars, a flat draw bar extending through the slot with its sides supported thereby and held non-rotatively by the stationary jaw with its sides opposed to the guide bars, means associated with the stationary jaw for moving the draw bar longitudinally, and a detent associated with the movable jaw and operable in the plane of its flatwise extent to engage the edge of the draw bar.

21. A clamp including in combination, a pair of laterally spaced flat guide bars, an anchor block secured between the bars at one end thereof, a stationary jaw secured between the bars at the end thereof opposite the anchor block, a movable jaw located between the guide bars and slidable thereon, said jaw having a median slot parallel with the guide bars, a flat draw bar extending through the slot with its sides supported thereby and held non-rotatively by the stationary jaw with its sides opposed to the sides of the guide bars, means associated with the stationary jaw for moving the draw bar longitudinally, and a detent associated with the movable jaw and operable in the plane of its flatwise extent to engage the edge of the draw bar.

In testimony whereof I affix my signature.

HUGO V. STEUERNAGEL.